United States Patent [19]

Sundhar

[11] Patent Number: 4,955,203

[45] Date of Patent: Sep. 11, 1990

[54] AIR CONDITIONER FOR PARKED AUTOMOTIVE VEHICLE

[76] Inventor: Shaam P. Sundhar, 87 Juniper Ave., Westerville, Ohio 43081

[21] Appl. No.: 394,447

[22] Filed: Aug. 16, 1989

[51] Int. Cl.⁵ .............................................. F25B 21/02
[52] U.S. Cl. ....................................... 62/361; 62/235.1; 62/244; 98/2.02; 98/900
[58] Field of Search ...................... 62/3.61, 235.1, 244; 98/2.02, 900, 2.18, 2.19; 136/245, 291

[56] References Cited

U.S. PATENT DOCUMENTS

| | | | |
|---|---|---|---|
| 2,802,347 | 8/1957 | Marcus | 62/244 |
| 3,302,414 | 2/1967 | Sudmeier | 62/3.61 |
| 3,307,364 | 3/1967 | DeCostelet | 62/361 |
| 3,943,726 | 3/1976 | Miller | 62/235.1 |
| 4,658,597 | 4/1987 | Shum | 62/235.1 |

FOREIGN PATENT DOCUMENTS

| | | | |
|---|---|---|---|
| 2477688 | 9/1981 | France | 62/3.61 |
| 67510 | 4/1983 | Japan | 98/2.02 |
| 67511 | 4/1983 | Japan | 98/2.02 |

Primary Examiner—William E. Tapolcai
Attorney, Agent, or Firm—Biebel, French & Nauman

[57] ABSTRACT

An air conditioning unit is provided for a parked automotive vehicle having a cooling unit comprising a cooling chamber with at least one insulated wall having on opposite sides thereof a heat sink and a cooling block having there between a thermoelectric chip. The air conditioning unit also comprises an air intake conduit, a cool air conduit, an exhaust conduit, and means for supplying power to the cooling unit. A method for cooling a parked automotive vehicle through the use of the air conditioning unit disclosed in the invention is also provided.

17 Claims, 3 Drawing Sheets

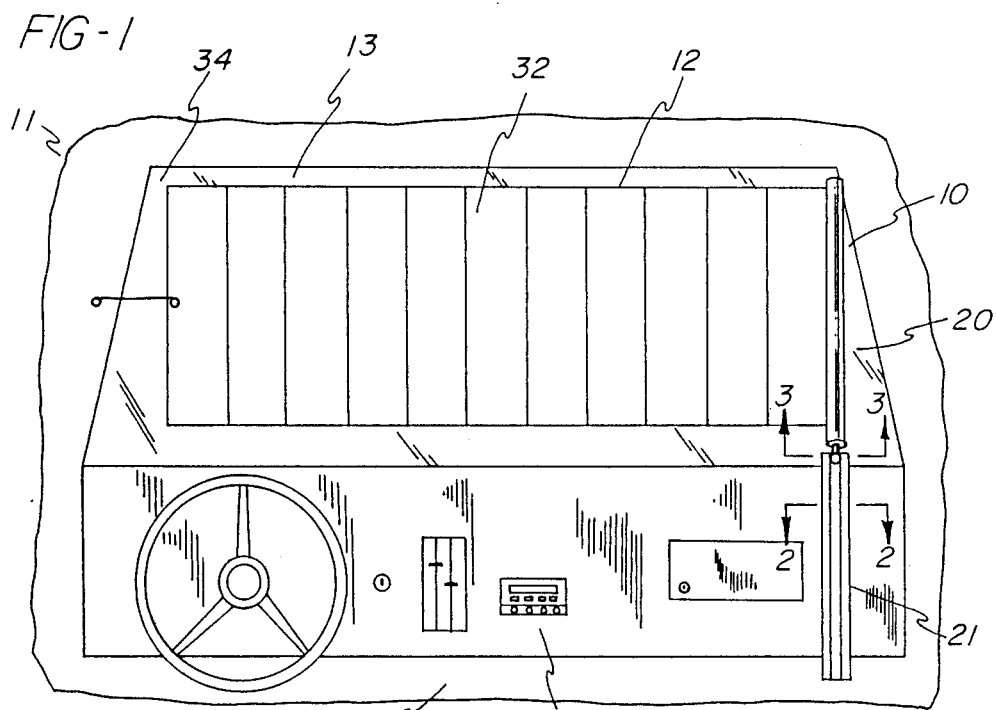
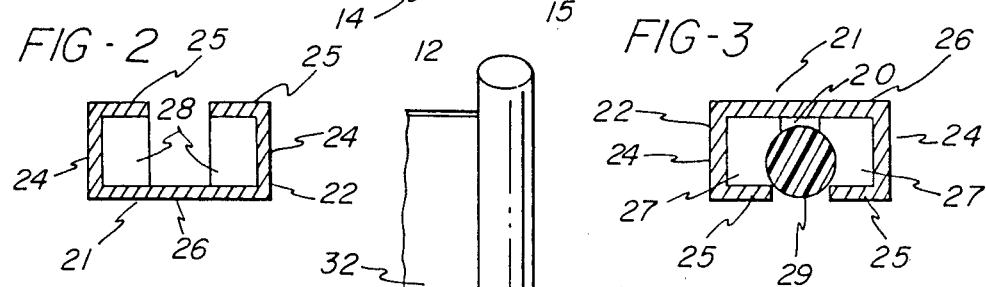
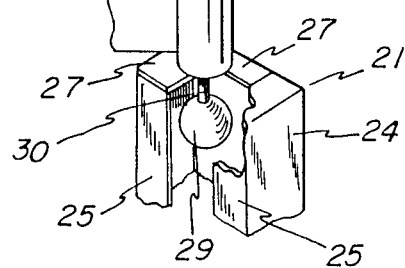

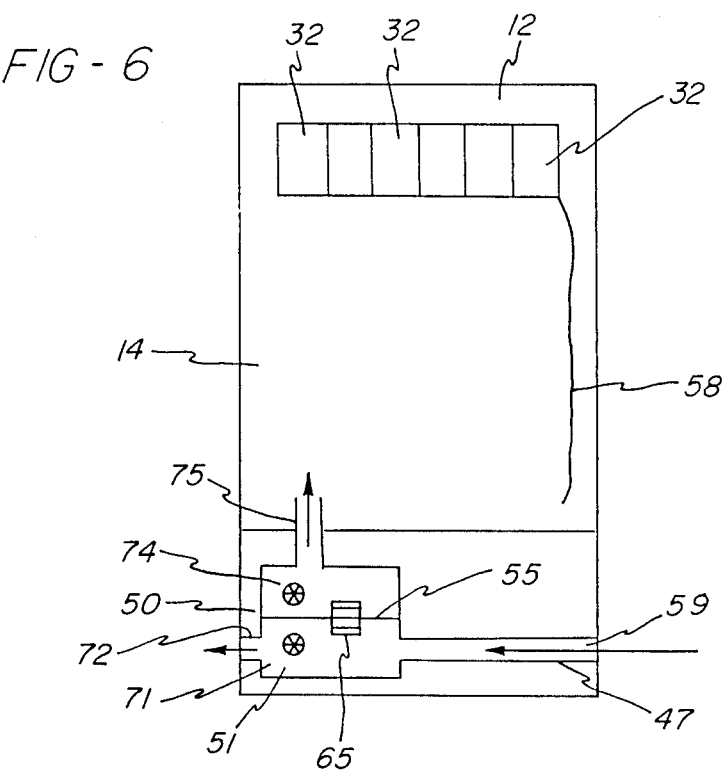
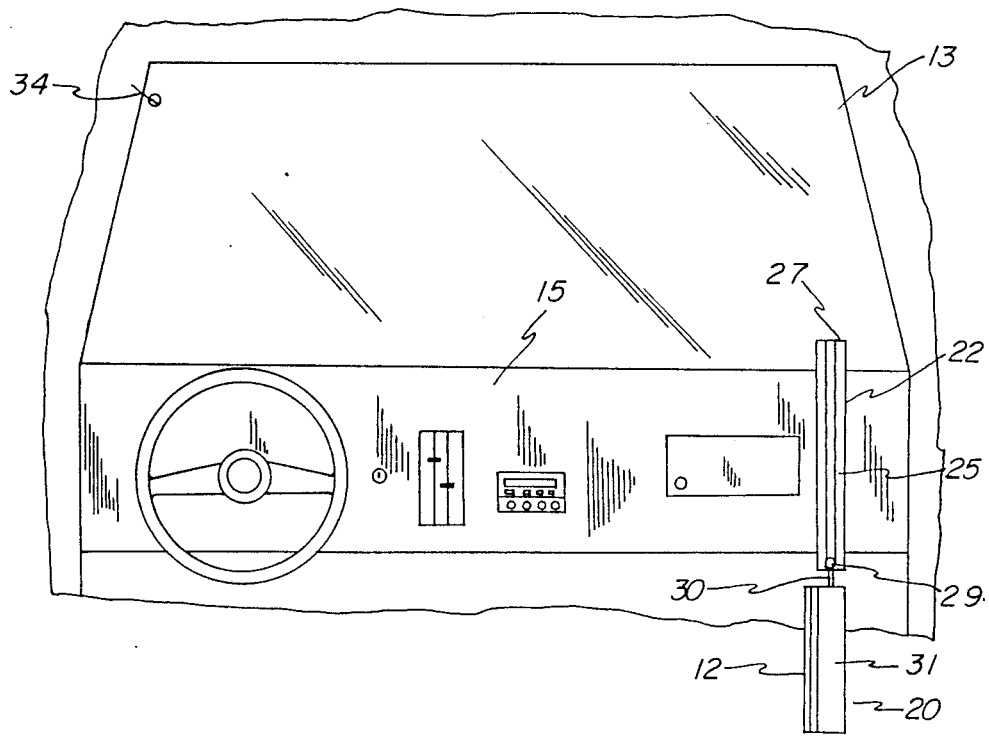

AIR CONDITIONER FOR PARKED AUTOMOTIVE VEHICLE

BACKGROUND OF THE INVENTION

The present invention relates generally to an air conditioner for automotive vehicles, and more particularly to one which can be used in a parked vehicle.

One of the most unpleasant experiences on a hot day is to return to a parked vehicle, open the door, and drive away in a vehicle whose interior temperature is often greater than 120 Fahrenheit. Numerous approaches exist which attempt to diminish or resolve the problem. Typical of such approaches is rolling down the car window slightly to allow the heated air to escape, opening the interior vents to provide for some possible exodus of the heated air, the utilizing of cardboard window shields to decrease exposure of the air in the car to the rays of the sun, and air conditioning, which can be used in conjunction with rolled down windows once the vehicle is moving.

Attempts at removing the heated air from the passenger compartment of the vehicle utilizing the above methods are both slow and inefficient. Furthermore, attempts at blocking the rays of the sun merely reduce the temperature of the heated air, as opposed to eliminating the heated air from the passenger compartment. Finally, the use of an automotive vehicle air conditioning system is only possible when the vehicle's ignition system is in operation, such that fuel is being consumed. Additionally, to eliminate problems with cooling the system, it is generally accepted practice to operate the system only at times when the vehicle is being driven.

It is thus apparent that the need exists for an apparatus for cooling the inside of a parked vehicle which provides adequate cooling of the air in the passenger compartment as well as conserving fuel.

SUMMARY OF THE INVENTION

There is disclosed an air conditioner for an automotive vehicle having a cooling unit comprising a cooling chamber with at least one insulated wall having on opposite sides thereof a heat sink and a cooling block. Positioned between the heat sink and cooling block and/or cold sink is a thermoelectric chip or module. The air conditioner also includes an air intake conduit, a cool air conduit, an exhaust conduit, and means for supplying power to the cooling unit. Means for supplying the power for the air conditioner preferably is by at least one solar panel positioned interiorly near the front window of the automotive vehicle. Preferably the cooling unit itself is located in the trunk of the automotive vehicle and comprises both a cooling chamber and a hot air chamber both having fans to assist in air circulation. The mounting means is mounted in a retention means preferably in the form of a C-shaped channel fastened to the dashboard of the automotive vehicle.

The invention also discloses a method for air conditioning a parked automotive vehicle comprising the steps of positioning means for supplying power, such means preferably comprising: at least one solar panel located interiorly near the front window of the passenger compartment of the automotive vehicle, with the solar panel being secured to mounting means movably mounted in a retention means; providing power for the operation of a thermoelectric chip located in a cooling unit comprising a cooling chamber, having at least one insulated wall having on opposite sides thereof a heat sink and a cooling block with the thermoelectric chip positioned between the heat sink and the cooling block; cooling the air inside the cooling chamber by means of the heat absorbed by the cooling block; and permitting the flow of air from the cooling chamber into the passenger compartment.

It is the primary object of the present invention to provide an air conditioning unit to keep the passenger compartment of the car from becoming excessively heated while the automotive vehicle is parked, by the supplying of cooler air to the passenger compartment and the removal of excessively warm air from the compartment.

Yet another important object of this invention is to provide an air conditioning unit for a parked automotive vehicle which is energy efficient and does not deplete the fuel or battery used by the automotive vehicle.

Still yet another important object of the present invention is to provide an automotive air conditioner for use in a parked vehicle which is relatively easy to install and maintain.

Other objects and advantages from the invention will be apparent from the following description, the accompanying drawings, and the appended claims.

BRIEF DESCRIPTION OF THE DRAWINGS

FIG. 1 is a front elevational view of a portion of the invention installed in operative relationship in the passenger compartment of an automotive vehicle.

FIG. 2 is a horizontal sectional view on an enlarged scale taken along line 2—2 of FIG. 1.

FIG. 3 is a horizontal sectional view on an enlarged scale taken along line 3—3 of FIG. 1.

FIG. 4 is a perspective view of the mounting means and a portion of the retention means and solar panel shield on a greatly enlarged scale.

FIG. 5 is a front elevational view similar to FIG. 1 but showing that portion of the invention in its stored position.

FIG. 6 is a schematic of the components of the invention.

DETAILED DESCRIPTION OF THE INVENTION

Figure 7:
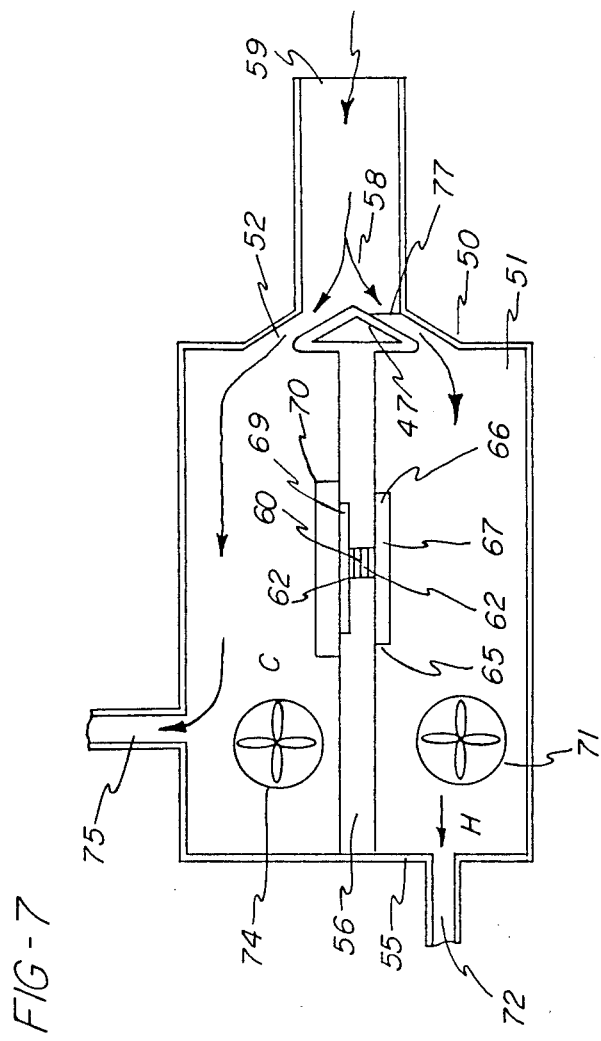
FIG. 7 is a top planned view on an enlarged scale primarily of the cooling chamber found in FIG. 6.

Having reference to the drawings, attention is directed first to FIG. 1 which illustrates the air conditioning unit of this invention as it is installed in its operative position, with the air conditioning unit designated generally by the numeral 10. As can be seen, the invention is installed in operative relationship in an automotive vehicle and has as one of its primary components a solar panel shield positioned interiorly near the front window 13 of the automotive vehicle 11. As such, this portion of the invention is positioned in the passenger compartment 14 of the vehicle preferably, on or adjacent to dashboard 15.

As can be seen in FIGS. 1-4, in addition to the solar panel shield 12, two other primary components of this invention are mounting means 20 and retention means 21. Mounting means 20 is in the form of a rod or bar which is secured to at least one end of the solar panel shield 12. The retention means 21 preferably comprises a C-shaped channel 22 having sidewalls 24 front panels 25 rear panel 26 top end panel 27 and bottom end panels 28.

A ball member 29 is secured to mounting means 20 by a mounting screw 31 which extends into mounting rod 31. Thus, the mounting rod 31 and ball 29 are capable of movement within the C-shaped channel 22 of retention means 21, as the preferably retention means extends from the top to the bottom of the dashboard 15 to which it is preferably secured.

Mounting means 20 provides a means of support for the plurality of solar panels 32 which make up the solar panel shield 12. The end of the solar panel shield opposite that secured to the mounting means 20 is provided with cooperative fastening means 34 which engage with a component of the fastening means preferably secured on the window or frame of the automotive vehicle being on the driver's side. This permits the solar panel shield 12 in its operative position to be unfolded along the dashboard 15 interiorly of the front window 13, with the solar energy absorbing sections of the panels facing outwardly so as to facilitate the capturing of solar energy.

When the invention is not in use, the solar panel shield is detached from cooperative means 34 and folded preferably into a width of approximately 1"-2", as can be seen in FIG. 5. Once the solar panels 32 are folded against one another, the mounting means 20 is movably repositioned in the retention means 21 from the top of the retention means, to the bottom. The folded panels and mounting rod 31 are then out of the way of the driver during operation of the motor vehicle. The folded panels may be secured if desired by appropriate fastening means to the underside of the dashboard 15.

FIG. 6 discloses a schematic drawing of the components of the invention, showing solar panel shield 12, with its various solar panels 32 being connected to cooling unit 50 preferably by means of air intake conduit 47. Air intake conduit 47 extends from the outside of the vehicle into the trunk or rear of the vehicle 49 where it connects to cooling unit 50. Cooling unit 50 comprises a hot air chamber 51 and a cool air chamber 52 having insulated walls 55, with the most important insulated wall 55 being a center dividing wall 56. A power conduit 58 extends from solar panel shield 12 preferably through the air intake conduit 47 into hot air chamber 51 and thence to insulated wall 55 where the power conduit is secured to a thermoelectric chip 60, as can better be seen in FIG. 7. The thermoelectric chip is typical of those already in existence, such as a ceramic wafer with positive and negative legs of bismuth teleuride. The positive leg of that type of chip is doped with boron while the negative leg is doped with arsenic, such that its consistency is 99% bismuth teleuride and 1% arsenic. The thermoelectric chip is positioned between two adhesive layers 62, one of which is in contact with a heat sink 65, having back wall 66 and a plurality of horizontally disposed fins 67 to assist in the dissipation of heat as the hot air passes through and over the fins. The other adhesive layer 62 is in contact with a heat conductive block 69, although in the embodiment of this invention, the heat conductive block serves to provide a cooling portion 70 preferably in the form of a plurality of horizontally disposed fins which cools the air in the cool air chamber 52 as air passes over and through the fins. The heat conductive block 69 is preferably fabricated from aluminum. Maximum heat absorption and cooling occur when the air entering chamber 50, due to the location of the air access, passes directly over the fins.

Two fans assist in circulating the hot air into the hot air chamber and thence from it, helping to circulate the cool air from the cool air chamber 52 into the passenger compartment 14. The first of these fans is an exhaust fan 71 which helps to draw air through an air intake port 59, past the heat sink 65 and its fins 67, and then expel the heated air through exhaust conduit 72 having a closure means 73 in the form of either a filter or one-way valve. Meanwhile, the cooling fan 74 also draws air from conduit 47 across the cooling portion 70 of the heat conductive block 69 and forces it through the cool air conduit 75 into the passenger compartment. A closure means 77 is located in that part of the conduit 47 which enters hot air chamber 51 to inhibit passage of the hot air back into conduit 47 and thence into chamber 52. Power for both of these fans is also preferably provided by the power conduit 58 which takes its energy from the solar panels 32, although alternatively a charged power source may be used, such as a gel cell which may be charged via tail light power lines. It has been found that the solar panel shield 12 of this invention may generate up to 50 watts of power, such that additional known electronic devices may be incorporated into the apparatus such as fuses and toggle switches (which would permit the unit to be used to heat the interior of a parked automotive vehicle in winter by reversing the polarity of the chip, such that the heat conductive block would experience a reversal in terms of the heat given off or absorbed).

The invention thus provides for a method for air conditioning a parked automotive vehicle. In the first step, the solar panels are unfolded and positioned interiorly near the front window of the passenger compartment of the automotive vehicle, with the one end of the solar panel being secured to the mounting means which are movably mounted in the retention means, while the other end is preferably secured to either the window or the frame by cooperative fastening means 34. The solar shield thus provides power for the operation of the thermoelectric chip and fans. The cooling portion 70 of the heat conductive block 69 cools the air inside the cooling chamber 52 of the cooling unit 50 by means of the heat absorbed by the cooling block. Cooling fan 74 permits the flow of air from the cooling chamber into the passenger compartment through the cool air conduit while the exhaust fan 71 permits the flow of air into the hot air chamber and from the hot air chamber into the outside atmosphere by means of the exhaust conduit.

In the alternative embodiment of the invention which features a chargeable power source, such as a gel cell battery, a reflective panel or sheet is secured across the interior of the front windshield of the parked vehicle. The panel reduces the heat in the passenger compartment from what the heat would be without the panel in use. The chargeable power source thus cools the vehicle as in the preferred embodiment.

While the form of apparatus and method herein described constitute a preferred embodiment of this invention, it is to be understood that the invention is not limited to this precise form of apparatus or method and that changes may be made therein without departing from the scope of the invention which is to defined in the appended claims.

What is claimed is:

1. An air conditioner for an automotive vehicle comprising
    a cooling unit, said cooling unit located in the trunk of said automotive vehicle, said cooling unit comprising a cooling chamber having at least one insulated wall, said cooling chamber including a cooling fan, said insulated wall having on opposing sides thereof a heat sink and a cooling block, said cooling block being located in said cooling chamber, said heat sink and cooling block having therebetween a thermoelectric chip, said cooling unit also comprising a hot air chamber, said hot air chamber including an exhaust fan, an air intake conduit connected to said cooling unit, a cool air conduit connected to said cooling chamber, an exhaust conduit connected to said hot air chamber, and means for supplying power to said cooling unit, said means for supplying power to said cooling unit is by at least one solar panel positioned interiorly near the front window of said automotive vehicle, said means for supplying power movably mounted in said automotive vehicle, said means for supplying power secured to mounting means, said mounting means mounted in a retention means which includes a C-shaped channel.

2. The air conditioner according to claim 1 wherein said retention means is fastened to the dashboard of said automotive vehicle.

3. A method for air conditioning a parked automotive vehicle comprising the steps of positioning means for supplying power comprising at least one solar panel interiorly near the front window of the passenger compartment of said automotive vehicle, said solar panel being secured to mounting means, said mounting means movably mounted in retention means fastened to the dashboard of said automotive vehicle, providing power for operation of a thermoelectric chip, said power being provided by said means for supplying power, said thermoelectric chip being located in a cooling unit, said cooling unit comprising a cooling chamber having at least one insulated wall, said insulated wall having on opposing sides thereof a heat sink and a cooling block, said cooling block being located in said cooling chamber, said heat sink and cooling block having said thermoelectric chip therebetween, cooling the air inside said cooling chamber by means of the heat absorbed by said cooling block, and permitting the flow of air from said cooling chamber into said passenger compartment through a cool air conduit.

4. The method of claim 3 wherein said cooling unit also comprises a hot air chamber, said hot air chamber facilitating the flow of air from said passenger compartment into said hot air chamber.

5. The method of claim 4 in which the flow of air into said hot air chamber flows past said heat sink and exits said hot air chamber by means of an exhaust conduit.

6. The method of claim 5 in which said means for supplying power has two ends, one end being secured to said mounting means while the other end is detachably secured in said passenger compartment.

7. The air conditioner according to claim 1 wherein said means for supplying power to said cooling unit is a chargeable powersource.

8. The air conditioner according to claim 7 which includes means to shade the interior of said automotive vehicle.

9. The air conditioner according to claim 8 wherein said means to shade comprise a reflective panel.

10. An air conditioner for an automotive vehicle comprising a cooling unit, said cooling unit located in the trunk of said automotive vehicle, said cooling unit comprising a cooling chamber having at least one insulated wall, said cooling chamber including a cooling fan, said insulated wall having on opposing sides thereof a heat sink and a cooling block, said cooling block being located in said cooling block, said cooling block being located in said cooling chamber, said heat sink and cooling block having therebetween a thermoelectric chip, said cooling unit also comprising a hot air chamber, said hot air chamber including an exhaust fan, an air intake conduit connected to said cooling unit, a cool air conduit connected to said cooling chamber, an exhaust conduit connected to said hot air chamber, and means for supplying power to said cooling unit, said means for supplying power to said cooling unit is by at least one solar panel positioned interiorly near the front window of said automotive vehicle, said means for supplying power movably mounted in said automotive vehicle, said means for supplying power secured to mounting means, said mounting means mounted in a retention means, said retention means fastened to the dashboard of said automotive vehicle.

11. The air conditioner according to claim 10 wherein said means for supplying power to said cooling unit is a chargeable power source.

12. The air conditioner according to claim 11 which includes means to shade the interior of said automotive vehicle.

13. The air conditioner according to claim 12 wherein said means comprise a reflective panel.

14. An air conditioner for an automotive vehicle comprising a cooling unit, said cooling unit located in the trunk of said automotive vehicle, said cooling unit comprising a cooling chamber having an insulated wall having on opposing sides thereof a heat sink and a cooling block, said cooling block being located in said cooling chamber, said heat sink and cooling block having therebetween a thermoelectric chip, an air intake conduit connected to said cooling unit, a cool air conduit connected to said cooling chamber, an exhaust conduit connected to said heat sink, and means for supplying power to said cooling unit, said means for supplying power to said cooling unit is by at least one solar panel positioned interiorly near the front window of said automotive vehicle, said means for supplying power movably mounted in said automotive vehicle, said means for supplying power secured to mounting means, said mounting means mounted in a retention means, said retention means having a C-shaped channel.

15. The air conditioner according to claim 14 wherein said cooling chamber includes a cooling fan.

16. The air conditioner according to claim 15 wherein said cooling unit also comprises a hot air chamber.

17. The air conditioner according to claim 16 wherein said hot air chamber includes an exhaust fan.

* * * * *